(12) United States Patent
Mirus et al.

(10) Patent No.: US 12,504,737 B2
(45) Date of Patent: Dec. 23, 2025

(54) AUTONOMOUS MOBILE ENTITY (AME) RISK MONITORING AND MANEUVERING SYSTEMS

(71) Applicant: Intel Corporation, Santa Clara, CA (US)

(72) Inventors: Florian Mirus, Eppelheim (DE); Fabian Oboril, Karlsruhe (DE); Frederik Pasch, Karlsruhe (DE); Cornelius Buerkle, Karlsruhe (DE); Kay-Ulrich Scholl, Malsch (DE); Ruchika Singh, Chandler, AZ (US); Rita Chattopadhyay, Chandler, AZ (US); Rony Ferzli, Chandler, AZ (US); Thierry Beaumont, Paris (FR)

(73) Assignee: Intel Corporation, Santa Clara, CA (US)

( * ) Notice: Subject to any disclaimer, the term of this patent is extended or adjusted under 35 U.S.C. 154(b) by 822 days.

(21) Appl. No.: 17/556,925

(22) Filed: Dec. 20, 2021

(65) Prior Publication Data

US 2022/0113698 A1    Apr. 14, 2022

(51) Int. Cl.
*G05B 19/4061* (2006.01)
*G05B 19/418* (2006.01)

(52) U.S. Cl.
CPC ..... *G05B 19/4061* (2013.01); *G05B 19/4183* (2013.01); *G05B 19/41895* (2013.01)

(58) Field of Classification Search
CPC ............ G05B 19/4061; G05B 19/4183; G05B 19/41895; G05B 2219/31003; G05B 2219/39091; G05B 2219/40202; B25J 9/1676; Y02P 90/02
See application file for complete search history.

(56) References Cited

U.S. PATENT DOCUMENTS

| | | | |
|---|---|---|---|
| 11,062,526 B1 * | 7/2021 | Yoo | G06F 3/011 |
| 11,887,480 B2 * | 1/2024 | Verbeke | G08G 1/166 |
| 2018/0105107 A1 * | 4/2018 | Hassan-Shafique | G08G 1/164 |

FOREIGN PATENT DOCUMENTS

| | | | |
|---|---|---|---|
| DE | 102022131786 | 6/2023 | |
| JP | 2018097710 A * | 6/2018 | G01C 21/3667 |

OTHER PUBLICATIONS

JP 2018097710 A—English translation (Year: 2018).*

(Continued)

*Primary Examiner* — Jason Holloway
(74) *Attorney, Agent, or Firm* — Schwegman Lundberg & Woessner, P.A.

(57) ABSTRACT

Various systems and methods for detecting risk conditions in a physical workspace. An apparatus can include an interface to receive smart sensor signals from at least one autonomous mobile entity (AME) in the physical workspace. The apparatus can also include processing circuitry coupled to the interface to detect a risk condition associated with the at least one AME, based on the smart sensor signals, relative to a user device associated with a human present in the physical workspace. The processing circuitry can also detect a direction of the risk condition relative to the user device and cause a notification to the first user device. The notification (Continued)

can indicate the direction of the risk condition relative to the user device. Other systems, methods and apparatuses are described.

25 Claims, 10 Drawing Sheets

(56) References Cited

OTHER PUBLICATIONS

"ISO TS 15066 Robots and robotic devices-Collaborative robots", Reference numberISO TS 15066:2016(E), (Feb. 15, 2016), 40 pages.

"MIR500 User Guide vol. 1.0", [Online]. Retrieved from the Internet: https: cobotwebshop.com pdf mir500_user_guide_v10.pdf, (Oct. 2018), 73 pages.

"Safety Laser Scanners SICK catalog", [Online]. Retrieved from the Internet: https: franklinempire.com media document s i sick_6010019_catalog.pdf, (Mar. 28, 2013), 56 pages.

Baek, Jieun, "Smart Glasses-Based Personnel Proximity Warning System for Improving Pedestrian Safety in Construction and Mining Sites", International journal of environmental research and public health 17.4, (Feb. 22, 2020), 15 pages.

David, V Lu, "Layered Costmaps for Context-Sensitive Navigation", IEEE RSJ International Conference on Intelligent Robots and Systems, Chicago, IL, (Sep. 2014), 7 pages.

Hanna, Atieh, "Towards safe human robot collaboration-Risk assessment of intelligent automation", 2020 25th IEEE International Conference on Emerging Technologies and Factory Automation (ETFA). vol. 1. IEEE, (Sep. 8, 2020), 8 pages.

Jobes, Christopher, "Determining Proximity Warning and Action Zones for a Magnetic Proximity Detection System", 2011 IEEE Industry Applications Society Annual Meeting, (Oct. 9, 2011), 7 pages.

Rosenstrauch, Martin, "Safe Human Robot Collaboration Introduction and Experiment Using ISO TS 15066", 2017 3rd International conference on control, automation and robotics (ICCAR). IEEE, (Apr. 24, 2017), 5 pages.

Rowntree, Thomas, "Real-Time Human Gaze Estimation", 2019 Digital Image Computing: Techniques and Applications (DICTA). IEEE, (Dec. 2, 2019), 7 pages.

\* cited by examiner

AUTONOMOUS MOBILE ENTITY (AME) RISK MONITORING AND MANEUVERING SYSTEMS

TECHNICAL FIELD

Embodiments described herein generally relate to autonomous mobile entity (AME) systems controlled through networked and edge computing systems, and in particular to centralized control of AME maneuvering and risk mitigation.

BACKGROUND

Today's factory floors, warehouses and manufacturing plants are typically unstructured and sometimes even cluttered environments, which makes them hard to perceive and fully comprehend for autonomous mobile entities (AMEs) and human users. Centralized control, for example through an edge computing system incorporated in factory systems, could help avoid dangerous conditions and improve maneuverability of AMEs within a factory, warehouse, or other area where humans may be present.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Today's factory floors, warehouses and manufacturing plants are typically unstructured and sometimes even cluttered environments, which makes them hard to perceive and fully comprehend for any automated system and even human workers. In addition, excessive noise created by multiple machines and automation systems complicates proper safety measures such as signaling warnings and alarms. Furthermore, any warning signals and alarms that are provided may be generic and not targeted to persons and equipment at risk.

Figure 1:
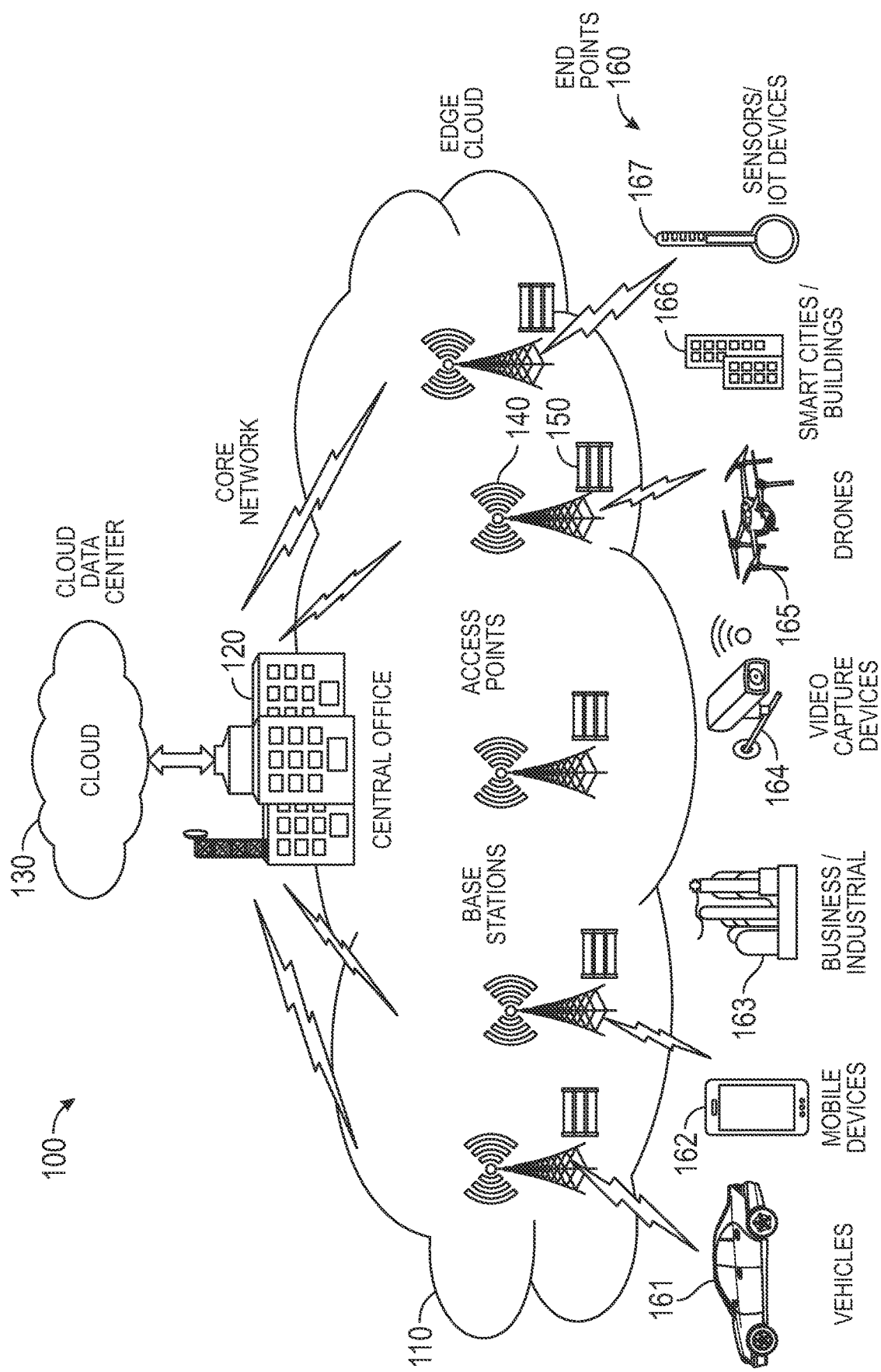
FIG. 1 illustrates an overview of an edge cloud configuration for edge computing.
Figure 2:
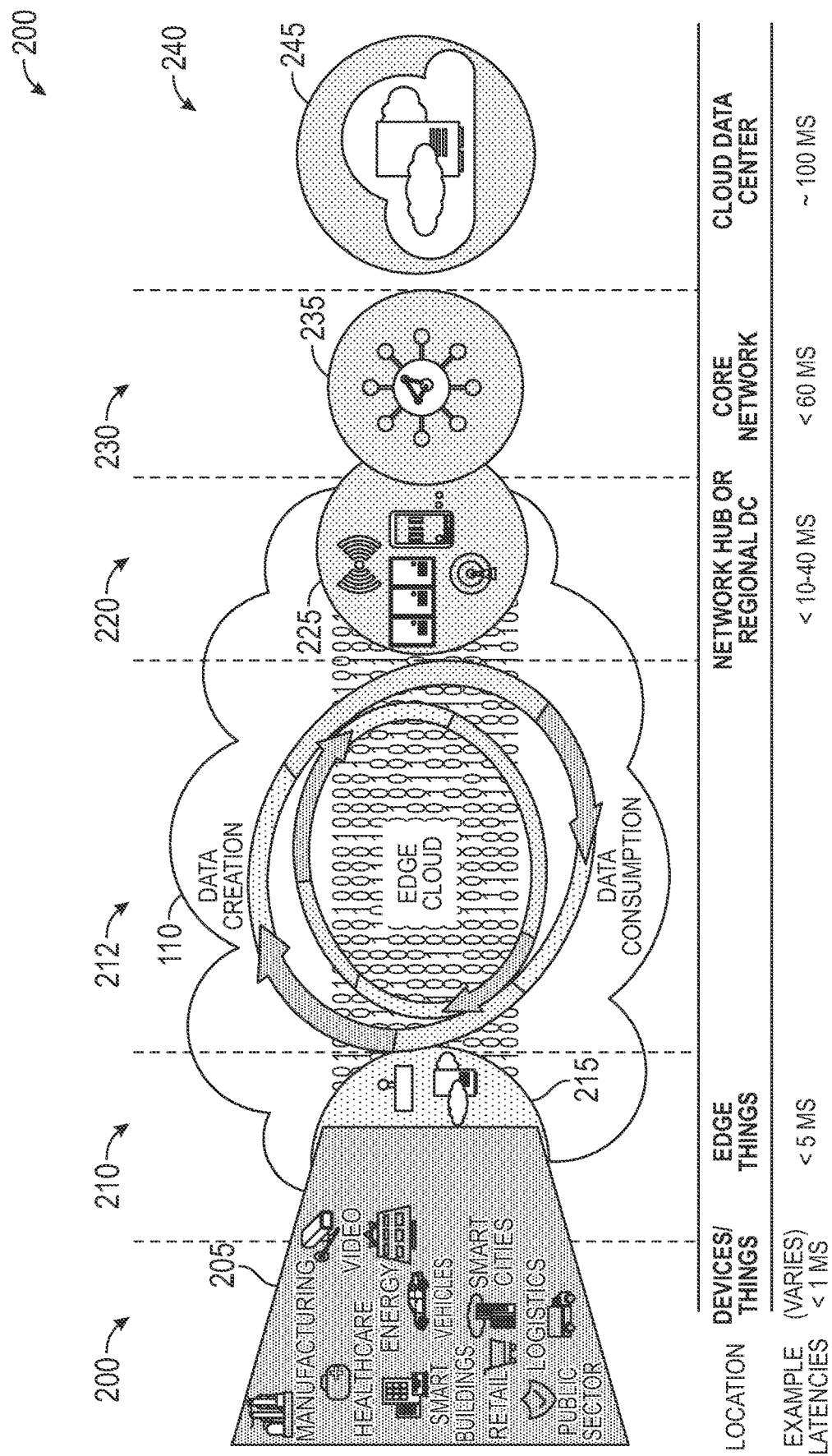
FIG. 2 illustrates operational layers among endpoints, an edge cloud, and cloud computing environments.
Figure 3:
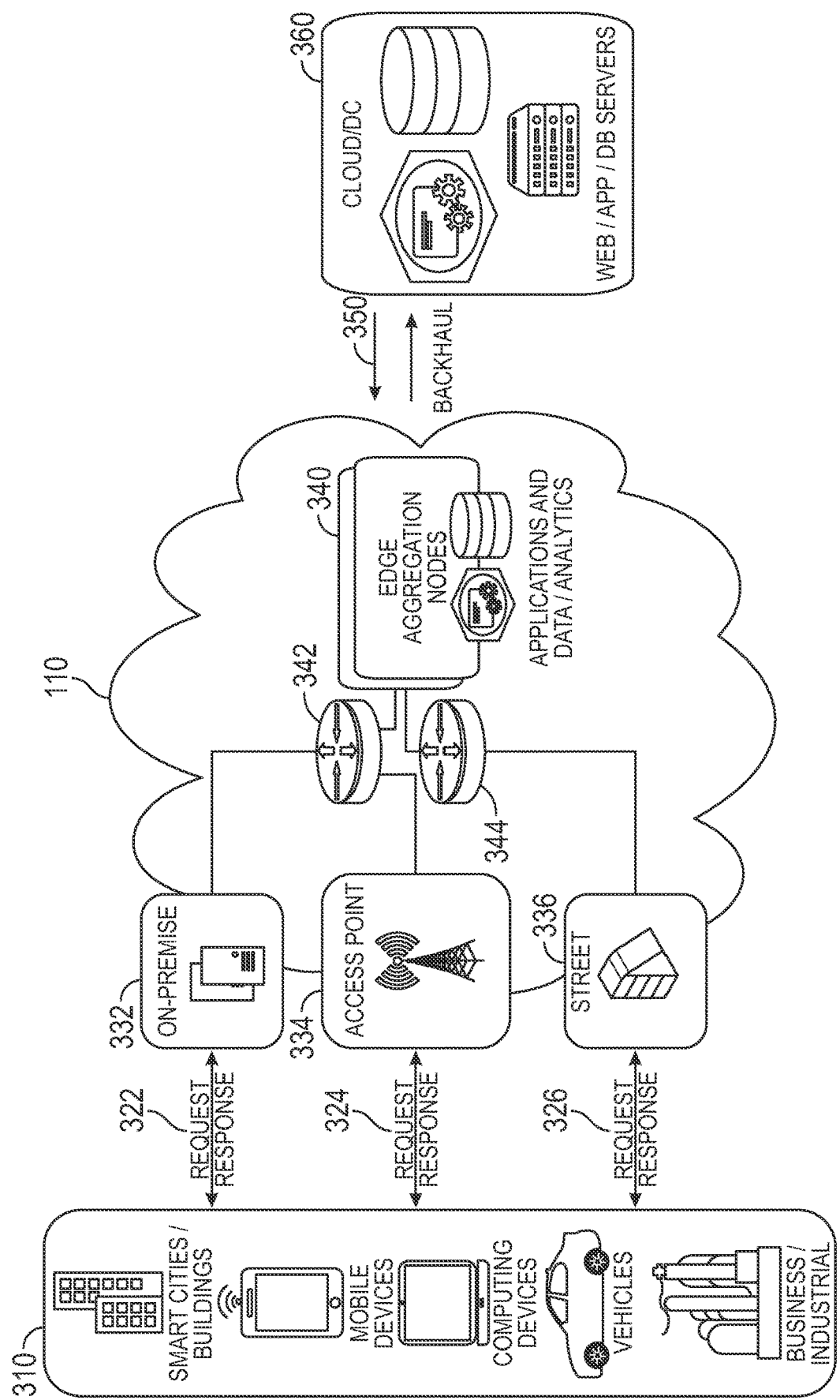
FIG. 3 illustrates an example approach for networking and services in an edge computing system.

Modern smart technologies, AMEs, and the internet of things (IoT) are often used in factory and other industrial environments, and the availability of smart sensors can be used to help avoid some of the above concerns. Methods and systems according to aspects, therefore, provide for a centralized risk monitoring and mitigation system that use IoT technology and edge computing to provide improved risk mitigation systems. FIG. 1-3 illustrate systems in which example embodiments may be deployed.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate or bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a paradigm in which computing is performed at or closer to the "edge" of a network, typically through the use of a computer platform (e.g., x86 or ARM computer hardware architecture) implemented at base stations, gateways, network routers, or other devices which are much closer to endpoint devices producing and consuming the data (e.g., at a "local edge", "close edge", or "near edge"). For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized computer hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210 (e.g., a "near edge" or "close edge" layer), to even between 10 to 40 ms when communicating with nodes at the network access layer 220 (e.g., a "middle edge" layer). Beyond the edge cloud 110 are core network 230 and cloud data center 240 layers, each with increasing latency (e.g., between 50-60 ms at the core network layer 230, to 100 or more ms at the cloud data center layer, both of which may be considered a "far edge" layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may be an appliance computing device that is a self-contained processing system including a housing, case, or shell. In some cases, edge devices are devices presented in the network for a specific purpose (e.g., a traffic light), but that have processing or other capacities that may be harnessed for other purposes. Such edge devices may be independent from other networked devices and provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 10B. The edge cloud 110 may also include one or more servers and/or one or more multi-tenant servers. Such a server may implement a virtual computing environment such as a hypervisor for deploying virtual machines, an operating system that implements containers, etc. Such virtual computing environments provide an execution environment in which one or more applications may execute while being isolated from one or more other applications.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Centralized risk monitoring and mitigation system including customized warnings: As mentioned earlier herein, excessive noise and crowding on modern factory floors and warehouses can complicate safety measures such as alarms. For example, any warning signals and alarms that are provided may be generic and not targeted to persons and equipment at risk.

Systems, apparatuses, and methods according to aspects address these concerns by providing a centralized risk monitoring and mitigation system including individually customized warnings for smart factories with AMEs or other automated devices sharing a workspace with human staff. Data from sensors in the infrastructure or mounted on mobile AMEs can be collected in a centralized system over the cloud to estimate the individual risk of humans in the factory. Depending on the risk level, an individual warning may be sent to the respective user devices (e.g., ear protection headphones) to make the apparatus user aware of the source and location of the risk. In some examples, signals can be made to seem sourced at the location of the original risk.

Figure 4:
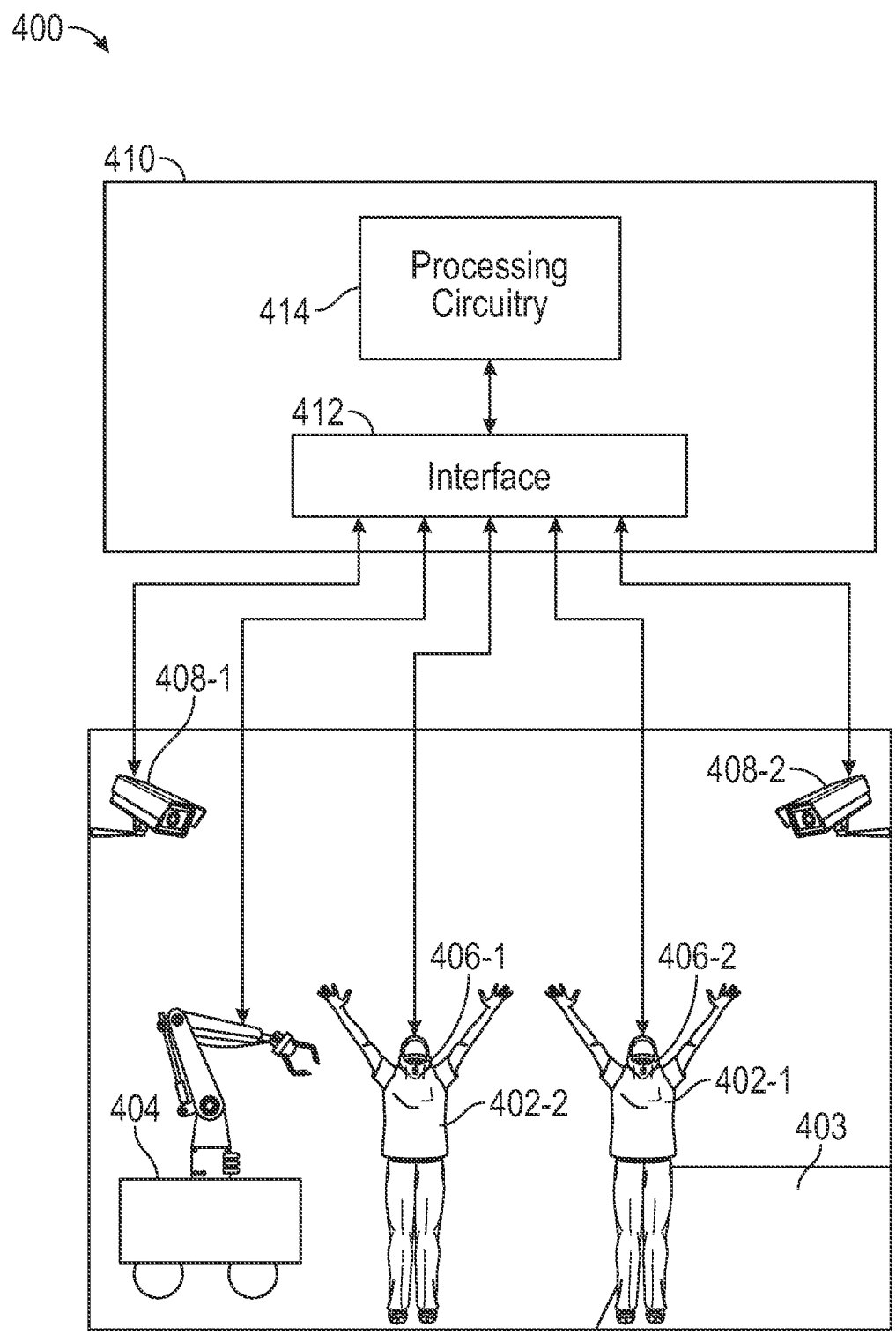
FIG. 4 illustrates a system in which centralized risk monitoring and mitigation can be implemented according to some aspects.

FIG. 4 illustrates a physical workspace 400 in which centralized risk monitoring and mitigation can be implemented according to some aspects. In FIG. 4, humans 402-1 and 402-2 can share the physical workspace 400 with a mobile device, e.g., an AME 404. Humans 402-1 and 402-2 can utilize hearing protection (e.g., devices 406-1, 406-2) as part of a normal work procedure. The physical workspace 400 can include cameras 408-1, 408-2 as well as other sensors (not shown in FIG. 4). In some aspects, the AME 404 can include sensors, such as machine vision sensors (not shown in FIG. 4). The humans 402-1, 402-2, AME 404, cameras 408-1, 408-2 and any other computing devices can communicate to a centralized risk monitoring and mitigation apparatus 410 using any of the communication methods described herein with respect to FIGS. 1-3, 10A and 10B, such as through the cloud, within an edge computing environment and/or in an IoT environment.

Humans 402-1, 402-2 may be at risk of danger, e.g., collision, from AME 404, but may be unable to discern the approach of the AME 404. Other risk conditions can exist, such as dangerous conditions detected by the cameras 408-1, 408-2 or other sensors in the physical workspace 400. Still other error conditions can exist when a human 402-1, 402-2 enters a particular area, e.g., area 403. Some conditions may relate to one human 402-1, 402-2 but not to other humans in the physical workspace 400. It may be desirable to avoid providing danger notifications, e.g., alarms, to users not at risk or not proximate to a risk, to avoid fatigue, distractions, and other issues.

To address these concerns, a centralized risk monitor and mitigation apparatus 410 can collect sensor information from infrastructure sensors (e.g., cameras 408-1, 408-2, sensors mounted on the AME 404, and any other sensors) to assess risks and to issue individual warnings only audible to the respective human 402-1, 402-2. The warnings can be specific to the situation, area, or human 402-1, 402-2 in some aspects. Some components of the centralized risk monitor and mitigation apparatus 410 are shown in FIG. 4 for ease of reference, but it will be understood that the centralized risk monitor and mitigation apparatus 410 can include any of the components described in FIGS. 10A and 10B and can communicate according to any of the aspects described in FIG. 1-3 and FIG. 10A-10B. For example, the apparatus 410 can include an interface 412 to receive smart sensor signals from at least one device (e.g., AME 404, cameras 408-1, 408-2, etc.) in the physical workspace 400.

The apparatus 410 can include processing circuitry 414 coupled to interface 412. The processing circuitry 414 can detect a risk condition associated with the at least one device relative to at least a first user device (e.g., device 406-1, 406-2) in the physical workspace 400. Example user devices can include sound protection devices (e.g., headphones), smart phones, smart glasses, augmented reality (AR) components, wearable components, clothing, etc. Audio warnings can comprise audio signals provided at headphones and smart phones, using different levels of frequency and volume as described later herein. Visual warnings can include lights, text, etc. provided at a user's smart phone, smart glasses, AR components, etc. Tactile or haptic feedback can be provided to wearable devices, for example. Such tactile or haptic feedback can include vibrations, heat, pulses, etc.

Equation (1) expresses factors that can determine risk:

$$R(w,r)=f(task_w, task_r, position_w, position_r, motion_w, motion_r, gaze_w) \quad \text{EQUATION (1)}$$

where w is the worker or human (e.g., 402-1, 402-2) to whom the risk pertains, r is the AME (e.g., AME 404) or other mobile, non-human device or apparatus that can cause risk.

In some aspects, the risk can be approximated based on proximity (e.g., based on $position_w$, position of the worker or $position_r$ the position of the AME 404) by calculating the remaining time to a close encounter in a probabilistic way, based on for example relative speed (determined from $motion_w$ and $motion_r$), and distance in addition to position.

The processing circuitry 414 can detect a direction of the risk condition relative to at least the first user device (e.g., device 406-1, 406-2), based on for example, $position_w$ and $position_r$. The processing circuitry 414 can provide a notification to at least the first user device (e.g., device 406-1, 406-2). The notification can indicate the direction of the risk condition relative to at least the first user device (e.g., device 406-1, 406-2). The processing circuitry can detect a direction of the risk condition relative to at least a second user device (e.g., device 406-1, 406-2) and adjust warnings accordingly based on the direction of the risk relative to the second user device.

In some aspects, the processing circuitry 414 can predict locations of the at least one device (e.g., the AME 404) based on a planned path of the at least one device. The processing circuitry 414 can further generate a map of physical locations of the at least one device (e.g., the AME 404) and at least the first user device (e.g., device 406-1, 406-2) within the physical workspace 400. In addition, an a priori map of the workspace indicating high-risk areas could be used in addition to the risk between human workers and AMEs. Such a map could be used to issue warnings when human workers approach or enter areas where additional safety measures and increased caution are required.

For various AME and human tasks (e.g., $task_w$ and $task_r$), there exist algorithmic approaches for AME-centric perception and even first cloud-based approaches. Thus, the final risk of a worker w and a AME is a function of the current state of the digital environment model with all cues collected in the apparatus 410. Risk can be significantly higher if the AME moves outside the human's field of view or is approaching from behind, and therefore $gaze_w$ can be important to determining risk in addition to the other factors listed above.

The processing circuitry 414 can provide the notification by simple verbal commands (localized to different languages, for example) and by varying at least one of a volume level and a frequency level of the notification based on a level of severity of the risk condition or on a proximity of the risk condition to at least the first user device (e.g., device 406-1, 406-2). For example, the volume of the warning signal can be a function of the noise in the environment and the estimated risk, according to Equation (2):

$$v=g(N)+p(R(w,r)) \quad (2)$$

where g(N) denotes a function to account for level of noise N in the environment and p denotes a piece-wise function of the estimated risk level.

Figure 5A:
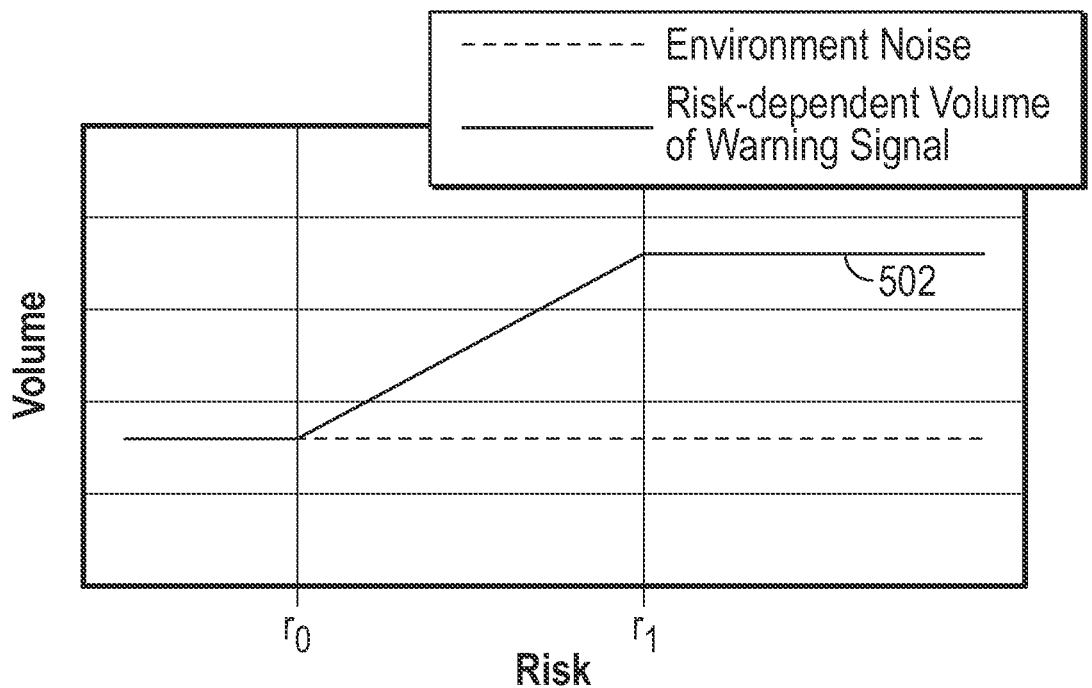
FIG. 5A illustrates volume of an alarm varying with risk according to some aspects.

In some examples, the processing circuitry 414 can ensure that the warning signal will be audible for the worker as it will be louder than the noise in the environment and that the volume will increase if the risk increases. For example, volume may increase with risk according to FIG. 5A. As can be seen in FIG. 5A, if the estimated risk surpasses a certain threshold $r_0$, the volume 502 of the warning signal is linearly increased until a maximal volume value is reached for a fixed risk value $r_1$.

Similarly, the frequency of the warning signal can be a function of the estimated risk and the distance between the human worker and the source of the risk, for instance, an approaching mobile AME according to Equation (3):

$$F=f(distance, risk) \quad (3)$$

Figure 5B:
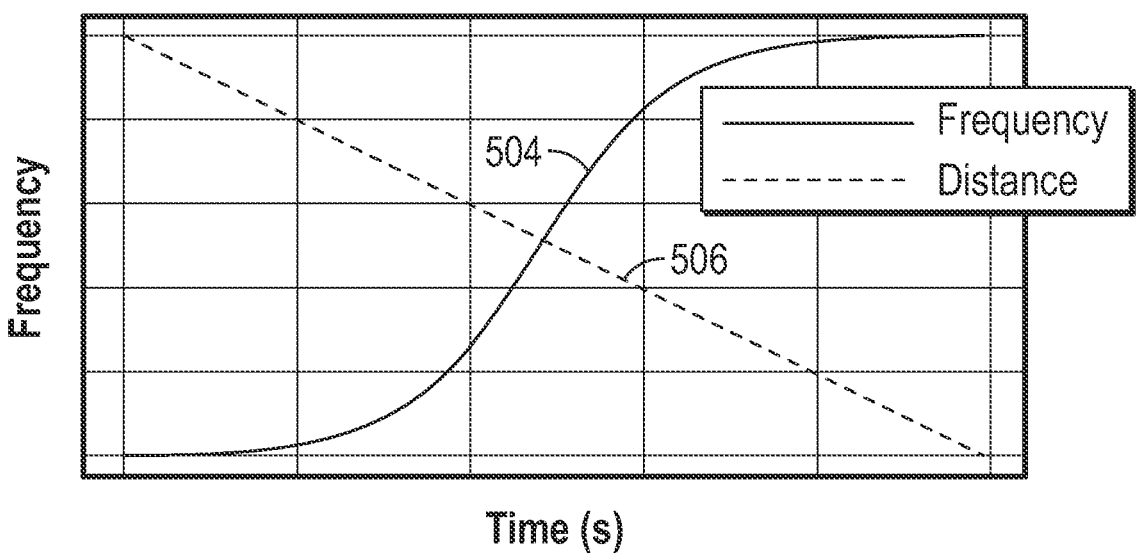
FIG. 5B illustrates frequency of an alarm varying with risk according to some aspects.

Furthermore, pre-defined alarm sound patterns can be used for different danger/risk levels depending upon the distance etc. FIG. 5B illustrates frequency 504 of an alarm relative to distance 506 of a risk. Assuming for simplicity, that the risk increases with decreasing distance 506 to the dangerous object, the frequency 504 of the warning increases accordingly. As can be appreciated from the above, the level of severity of the risk condition can be based on numerous factors. For example, the processing circuitry can detect time remaining to an encounter between the first user device (e.g., device 406-1, 406-2) and the risk condition, such that the level of severity of the risk condition is based on the time remaining to the encounter. Note, that the risk estimation is not only depending on the distance, but also on the location and gaze of the humans. That is, the risk will be lower if the human is aware that the distance to a potentially dangerous object is decreasing.

In some aspects, the processing circuitry 414 can provide a stereo effect, based on an estimated gaze of the human 402-1, 402-2 and location of the risk condition. The stereo effect can such that the notification appears to the first user device to be originated at the location of the risk condition. The location can be determined at least in part by a digital model of the environment covering real-time pose and gaze information of the humans 402-1, 402-2. By using location, pose and gaze information, the warning signal could be virtually placed where the danger is located to instantly inform the humans 402-1, 402-2 about the kind of danger (specific sound), severity/proximity of the risk. For example, the system can define pre-defined alarm sound patterns for different danger/risk levels depending upon the distance, severity, etc. of the risk.

The virtual location of the audio signal can be based on Equation (4):

$$\text{loc} = a(\text{gaze}_{human}, \text{location}_{human}, \text{location}_{AME}) \quad (4)$$

The virtual location of the warning signal depends on and therefore is a function of the location of the human (location$_{human}$), the location of the AME location$_{AME}$ and the gaze of the human gaze$_{human}$ (see Equation (4)) The location of the AME location$_{AME}$ can be inferred using a probabilistic sensor fusion approach (e.g., Kalman filters) incorporating information from several on-board sensors such as wheel odometry, gyroscope, accelerometers as well as cues in the environment as perceived by cameras and/or range-measuring sensors such as LiDAR (on-board or in the infrastructure).

Similarly, the location of the human location$_{human}$, could be estimated from sensors in the infrastructure as well as sensors on smart devices carried or worn by the human. Finally, the gaze of the human gaze$_{human}$ can be inferred from sensors on smart devices worn by the human (e.g., smart goggles or headphones) or by external sensors such as cameras in the infrastructure. Approaches based on the latter typically consist of several steps such as head detection, gaze estimation as well as tracking and data association. This results in a vector gaze$_{human}$ in 3D space representing the human gaze as well as 3D poses location$_{robot}$) and location$_{human}$, representing the locations of the AME and the human respectively. The vector v=lr−lh represents the direction of the AME from the location of the human. Using the distance d=|lr−lh| between the AME and the human as well as the angle alpha (or the cosine similarity) between the vectors gh and v enables the virtual placement of the warning signal at the real location of the AME (or, more generally, the source of the danger). In addition, the level of the warning signal may be increased if the angle alpha is large (i.e., the danger source is behind and/or out of sight of the human) and/or the distance d between the human and the AME decreases.

In additional aspects, depending on local privacy issues or laws, specific warning signals can be more personally tailored human 402-1, 402-2 receiving the alarm or notification. Additional aspects can provide a learning system that explores different warning sounds and collects the reaction time of the human 402-1, 402-2. Still further aspects can create a map of locations where most of safety warnings were issued to identify areas where additional safety means such as physical barriers or warning signs could be helpful for improved risk mitigation. Smart phones or other devices for providing notifications can be used in place of or in addition to headphones. Warning lamps and speakers can be provided elsewhere in the physical workspace 400 to provide warning signals to a group of users or an area of the physical workspace 400. A user can subscribe to the type of alarms that he or she wants to receive. In these and other examples, depending on the persona (e.g., the type of job description responsibilities of the user, etc.), the alarm can be programmed. For example, a factory floor supervisor or security personnel may want to receive all the alarms. A factory floor worker may want to receive alarms for threats/risk within a certain area around him or her, etc. In still other examples, if a threat exceeds a defined severity level, then it should be broadcast to all.

Figure 6:
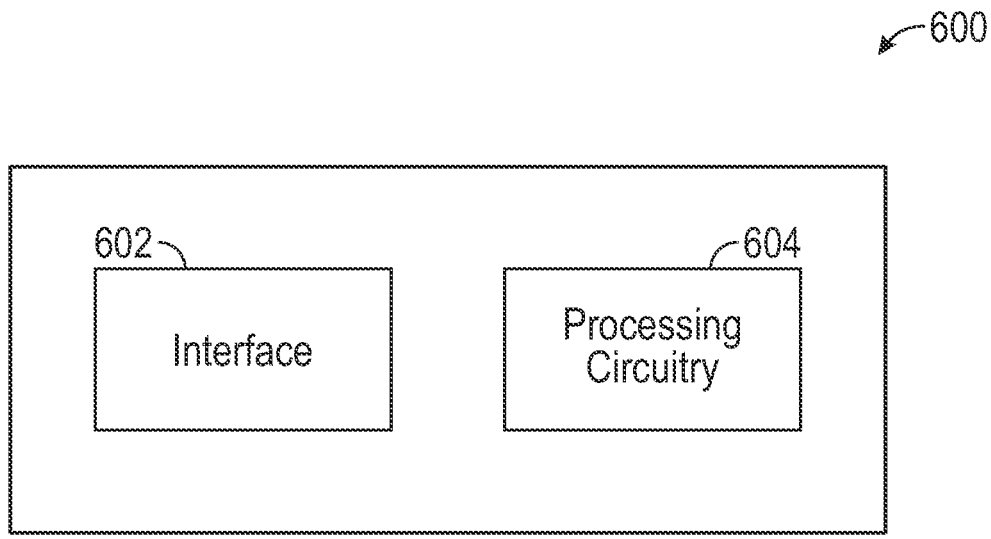
FIG. 6 illustrates a user apparatus in which example aspects can be implemented.

FIG. 6 illustrates a user apparatus 600 in which example aspects can be implemented. In aspects, the apparatus 600 (e.g., a noise protection device such as headphones) can include an interface 602 to receive risk management signals. The risk management signals can indicate at least directions of risks associated with the risk management signals, relative to the apparatus 600. The interface 602 can comprise a Bluetooth interface or any other interface capable of communication to the centralized risk mitigation system or other components and devices. The apparatus 600 can include processing circuitry 604 coupled to the interface 602 and configured to determine that a received risk management signal is directed to the apparatus 600. The components of apparatus 600 can be similar to the components of FIGS. 10A and 10B, and include other components not depicted in FIG. 6 and similar to components of FIGS. 10A and 10B, for example user displays, and other interface circuitry. For example, the apparatus 600 can include components to connect with a centralized risk monitoring system over the cloud. The apparatus 600 can also include circuitry to detect a physical location of the apparatus 600, and the apparatus 600 can provide location information over the interface 602 according to any methods or technologies described with respect to cloud, IoT and edge computing.

The processing circuitry 604 can provide a notification that indicates at least a direction of the risk, subsequent to determining that the received risk management signal is directed to the apparatus 600. The notification can include an audio signal. The audio signal can vary in at least one of volume and frequency based on at least one of a proximity of the risk to the apparatus 600 and a severity level of the risk. In these or other aspects, the notification can include a visual signal indicating a direction of the risk relative to the apparatus 600.

Safe maneuvering service across AME fleet: AMEs maneuvering in complex dynamic environments encounter diverse situations and each AME uses its set of on-board sensors to navigate around the environment. This per agent approach has limitations as each AME has a limited spatial and temporal view of its environment. Furthermore, dynamic environmental conditions like oil spills, obstacle density and lack of semantic understanding with respect to traffic at edges or curves in floor area, impede AMEs' ability for safe maneuvering and may cause sudden movements leading to hazards.

Methods and apparatuses in accordance with aspects address these and other concerns by providing safe maneuvering across a AME fleet. The safe maneuvering is offered as service by an edge or cloud computing system and allows subscribers with different profiles (AMEs, workers agents, other equipment) to receive safe maneuvering commands or alerts. Furthermore, the edge server learns safe maneuvers and creates adaptive policies for commands or alerts over time as incidents happen.

Systems, apparatuses, and methods according to some aspects provide a centralized view of the environment using infrastructure sensors as well as sensors on a AME or other mobile apparatus. In addition, collective environment analytics such as worker profiles and location, task planning software are used to generate a risk profile for the environment. The edge server then uses a risk profile map of environment to create safe maneuvering commands to mobile agents and/or alerts to humans.

Figure 7:
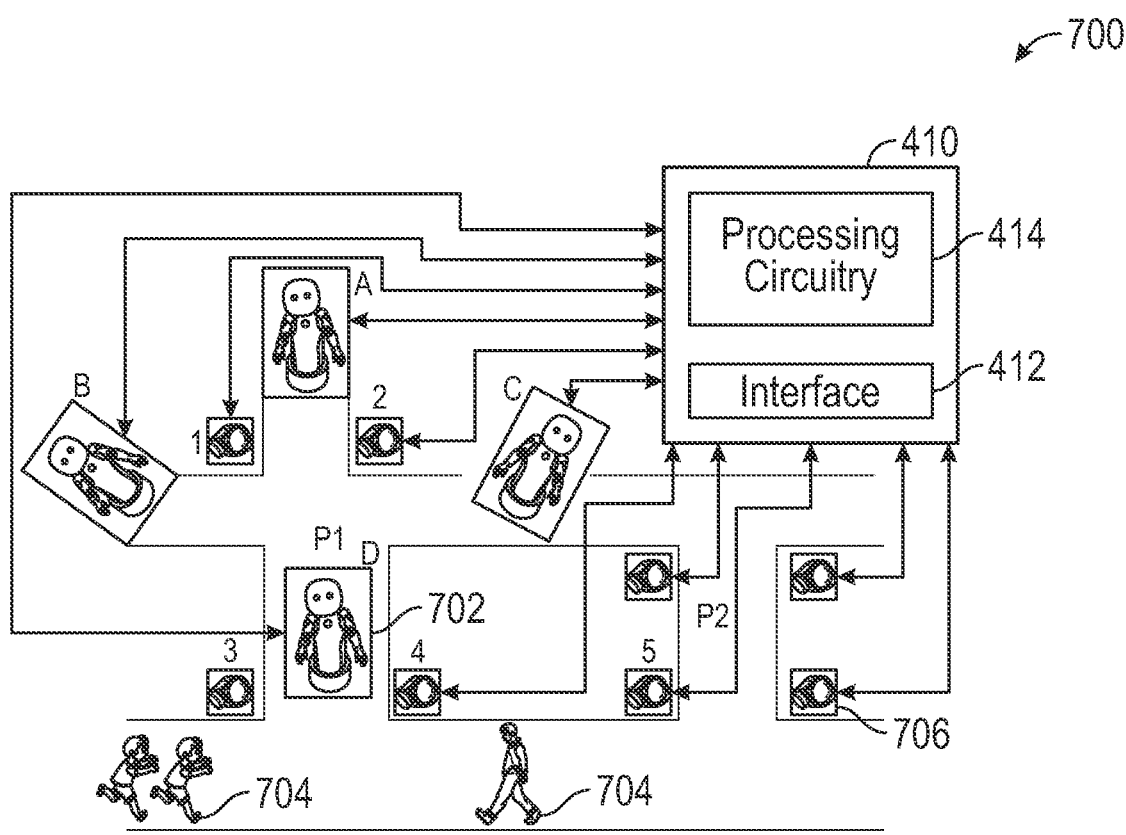
FIG. 7 illustrates a workspace in which potential intersections of movement can be detected in accordance with some aspects.

FIG. 7 illustrates a workspace 700 in which potential intersections of movement can be detected in accordance with some aspects. Methods described with reference to FIG. 7 can be performed using a centralized apparatus 410 similar to that described with reference to FIG. 4, i.e., apparatus 410 can include an edge server.

AMEs 702 can be performing work at various locations in the workspace 700, alongside workers 704. Cameras 706 can be placed at various locations including intersections and communicate back to the apparatus 410 similarly to the cameras, etc. described above with reference to FIG. 4.

The apparatus 410 can include an interface 412 to receive data, including visual data, audio data, positioning data, movement data, and other data that can be provided by sensors of two or more devices (e.g., AMEs 702, cameras 706) within a workspace 700.

The apparatus 410 can further include processing circuitry 414 coupled to the interface 412. Based on a digital map of the workspace 700 and based on the sensor signals received from the two or more devices (e.g., AMEs 702, cameras 706), the processing circuitry 414 can generate a risk profile map of the workspace 700. Input and output signals are described in more detail with respect to FIG. 8.

Figure 8:
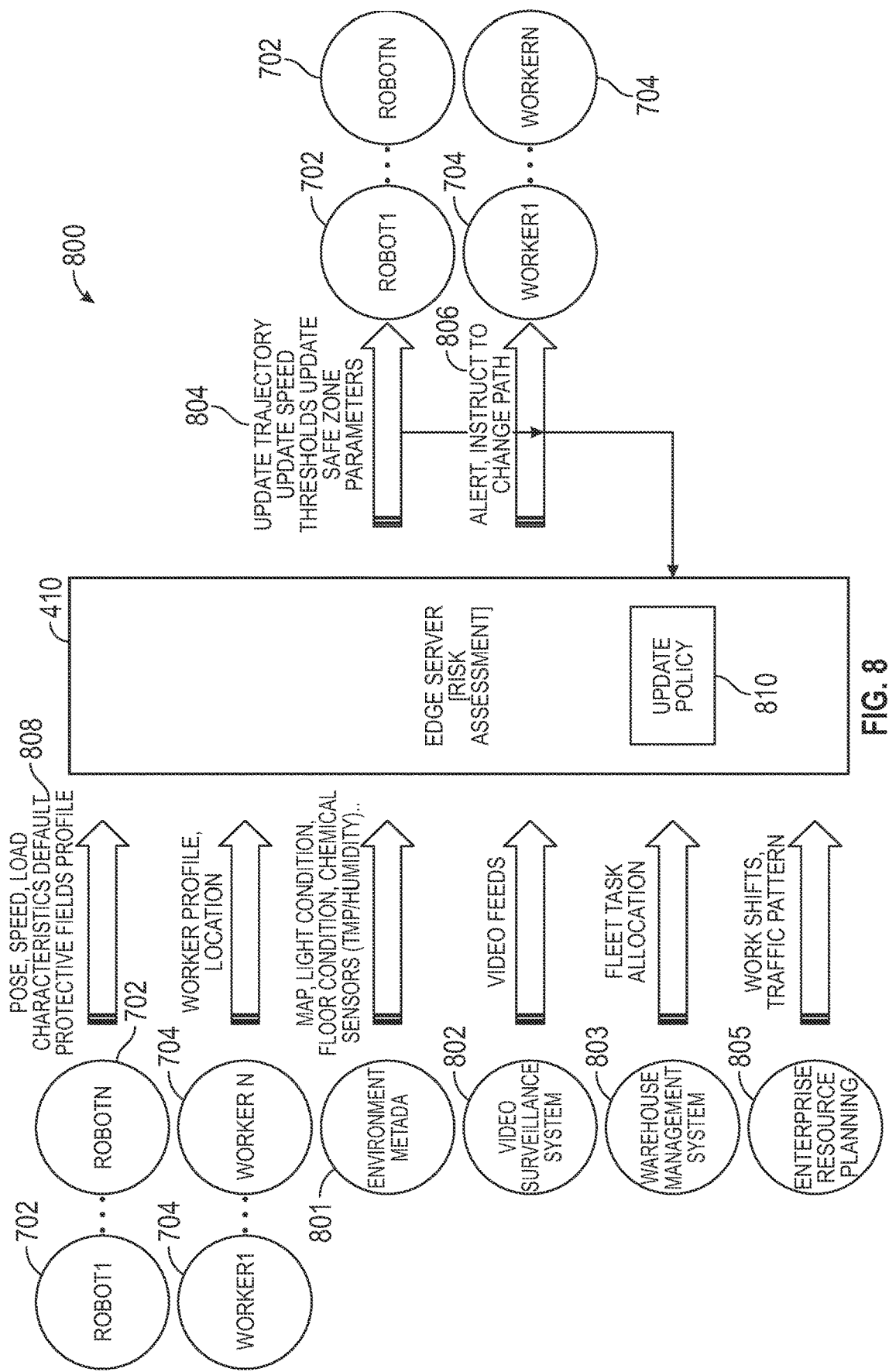
FIG. 8 illustrates input and output of an edge-based safety risk assessment in accordance with some aspects.

FIG. 8 illustrates input and output of an edge-based safety risk assessment system 800 in accordance with some aspects. The apparatus 410 provides a risk assessment taking input from various agents such as AMEs 702, workers 704, and sensors, for example cameras 706 provided in video surveillance system 802. Other inputs can include environmental data 801 such as maps, light conditions, floor conditions, chemical sensors, temperature sensors, humidity sensors, etc. Still further inputs can include warehouse management system 803 inputs such as fleet planning and task allocation. Other inputs can include human-based inputs 805 such as works shifts and traffic patterns for human operators. The apparatus 410 can output specific actions 804 and alerts 806 back to the agents through various channels with the intent to provide improved safety (i.e., reduce accidents).

For example, as an AME 702 navigates through a workspace 700, the AME 702 transmits various event parameters 808 (e.g., pose, speed, load characteristics, default protective fields profiles) and environmental data 801 to the apparatus 410. The apparatus 410, having access also to data of the video surveillance system 802, the warehouse management system 803 and human-based inputs 805, can create an event and reaction policy 810 based on environmental and/or event parameters encountered by several AMEs 702.

The reaction policy 810 is updated as a new situation arises, or better maneuvering reactions are identified. The apparatus 410 then uses proximity and environmental factors to warn other AMEs 702 or workers 704 of potential safe or non-safe situations along with identified reaction parameters such as speed thresholds 804, which can define maximum speeds and other operating conditions at which it might be advantageous for an AME 702 or worker 704 to operate at for the relevant conditions. The apparatus 410 can use environmental analytics to identify adaptive high/low speed zones based on obstacles that AMEs 702 encounter along a certain path and create an understating of traffic patterns as they change within a facility or with respect to time of the day or other relevant conditions.

The apparatus 410 can identify and warn AMEs in proximity for potential hazardous situations such as spills or lack thereof and proactively transmits speeds thresholds and maneuvering guidance based on environment analytics. In turn, the AME(s) 702 can continue to provide updates to the apparatus 410 regarding obstacles encountered, navigation changes, nature of the load, weight, size or toxicity of a load or other conditions in workspace 700.

Infrastructure sensors (e.g., cameras 706, thermometers, and other sensors) can also transfer data such as video analytics or time series data such as temperature, humidity, etc.

Based on the above factors and conditions, the apparatus 410 can create a dynamic risk assessment and provide information and risk mitigation actions to take to any AME 702 or other systems within the workspace 700. For example, the apparatus 410 can transfer reaction policy parameters or notification to all AMEs 702 within a workspace 700, wherein such parameters can include speed limit thresholds, areas to avoid, wait times based on traffic, and other details. The parameters can also be used to program a safety field within any safety field devices (e.g., scanners and machine vision devices). A safety field is configured by a AME 702 based on AME speed. For example, if an AME is operating at a high speed, the safety field in front of the AME 702 will be larger than if the AME was operating at a lower speed, to account for the probability that the AME will encounter other devices or humans while traveling at that higher speed. The safety field size can also be set based on traffic density, lighting conditions, or the profiles of nearby workers (e.g., workers 704).

In some examples, the apparatus 410 processing circuitry 414 can provide a notification to at least one of the two or more devices (e.g., AMEs 702 or workers 704) upon detecting a potential intersection of movement of the two or more devices. This detection can occur upon receiving input from at least one camera 706 within the workspace 700. The notification can be provided upon detecting motion of the two or more devices (e.g., AMEs 702 or workers 704) within a range of the at least one camera 706. The notification can include a notification to change or adapt path or speed, and can also comprise verbal, audio, or visual warnings.

In further examples, any of the compute nodes or devices discussed with reference to the present edge computing systems, for example systems included in factory and warehouse environments in which some aspects of the disclosure may be used including AMEs and other automated devices, may be fulfilled based on the components depicted in FIGS. 10A and 10B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 9:
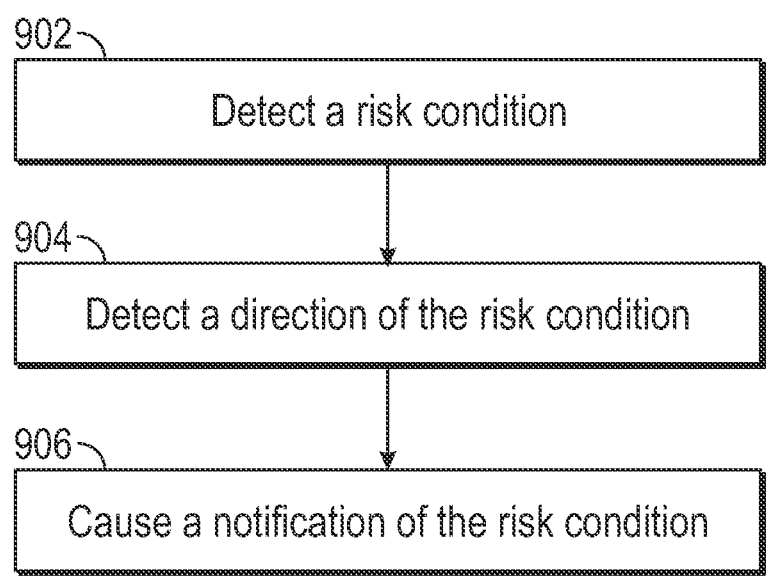
FIG. 9 is a flowchart of a method for notifying of risk in a physical workspace in accordance with some aspects.

FIG. 9 is a flowchart of a method 900 for notifying of risk in a physical workspace 400 in accordance with some aspects. The method 900 can be implemented by, for example, a centralized risk monitor and mitigation apparatus 410 (FIG. 4) or components thereof. The method 900 can be performed based on smart sensor signals received from at least one AME (e.g., AME 404 (FIG. 4)) in the physical workspace.

The method 900 can begin with operation 902 with the centralized risk monitor and mitigation apparatus 410 detecting a risk condition associated with the at least one AME 404, based on the smart sensor signals, relative to at least a first user device associated with a human (e.g., human 406-1, 406-2 (FIG. 4) present in the physical workspace 400.

In some examples, operation 902 can be performed based on Equation (1) described earlier herein.

The method 900 can continue with operation 904 with the centralized risk monitor and mitigation apparatus 410 detecting a direction of the risk condition relative to at least the first user device.

The method 900 can continue with operation 906 with the centralized risk monitor and mitigation apparatus 410 causing a notification to be provided to at least the first user device, the notification indicating the direction of the risk condition relative to at least the first user device. The notification can vary at least one of a volume level and a frequency level of the notification based on a level of severity of the risk condition, for example according to Equations (2) and/or (3) discussed earlier herein.

The method 900 can further include determining the amount of time remaining until an encounter between the first user device and the risk condition. The level of severity of the risk condition can be based on the time remaining to the encounter. The method 900 can further include predicting locations of the at least one device based on a planned path of the at least one device. These locations can be based on any of the maps described earlier herein with reference to FIG. 4 and FIG. 7.

Figure 10A:
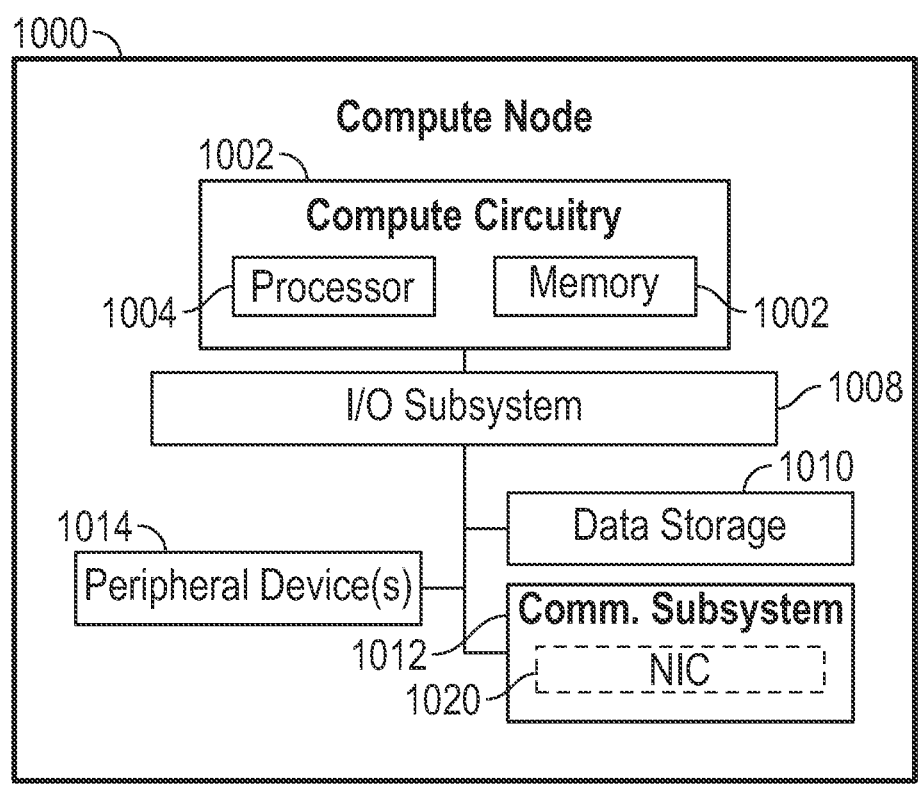
FIG. 10A provides an overview of example components for compute deployed at a compute node in an edge computing system.

In the simplified example depicted in FIG. 10A, an edge compute node 1000 includes a compute engine (also referred to herein as "compute circuitry") 1002, an input/output (I/O) subsystem 1008, data storage devices 1010, a communication circuitry subsystem 1012, and, optionally, one or more peripheral devices 1014. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1000 may be embodied as any type of engine, device, or collection of devices capable of performing various compute functions. In some examples, the compute node 1000 may be embodied as a single device such as an integrated circuit, an embedded system, a field-programmable gate array (FPGA), a system-on-a-chip (SOC), or other integrated system or device. In the illustrative example, the compute node 1000 includes or is embodied as a processor 1004 and a memory 1006. The processor 1004 may be embodied as any type of processor capable of performing the functions described herein (e.g., executing an application). For example, the processor 1004 may be embodied as a multi-core processor(s), a microcontroller, or other processor or processing/controlling circuit. In some examples, the processor 1004 may be embodied as, include, or be coupled to an FPGA, an application specific integrated circuit (ASIC), reconfigurable hardware or hardware circuitry, or other specialized hardware to facilitate performance of the functions described herein.

The memory 1006 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1006 may be integrated into the processor 1004. The memory 1006 may store various software and data used during operation such as one or more applications, data operated on by the application(s), libraries, and drivers.

The compute circuitry 1002 is communicatively coupled to other components of the compute node 1000 via the I/O subsystem 1008, which may be embodied as circuitry and/or components to facilitate input/output operations with the compute circuitry 1002 (e.g., with the processor 1004 and/or the main memory 1006) and other components of the compute circuitry 1002. For example, the I/O subsystem 1008 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1008 may form a portion of a system-on-a-chip (SoC) and be incorporated, along with one or more of the processors 1004, the memory 1006, and other components of the compute circuitry 1002, into the compute circuitry 1002.

The one or more illustrative data storage devices 1010 may be embodied as any type of devices configured for short-term or long-term storage of data such as, for example, memory devices and circuits, memory cards, hard disk drives, solid-state drives, or other data storage devices. Individual data storage devices 1010 may include a system partition that stores data and firmware code for the data storage device 1010. Individual data storage devices 1010 may also include one or more operating system partitions that store data files and executables for operating systems depending on, for example, the type of compute node 1000.

The communication circuitry subsystem 1012 may be embodied as any communication circuit, device, or collection thereof, capable of enabling communications over a network between the compute circuitry 1002 and another compute device (e.g., an edge gateway of an implementing edge computing system). The communication circuitry subsystem 1012 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry subsystem 1012 includes a network interface controller (NIC) 1020, which may also be referred to as a host fabric interface (HFI). The NIC 1020 may be embodied as one or more add-in-boards, daughter cards, network interface cards, controller chips, chipsets, or other devices that may be used by the compute node 1000 to connect with another compute device (e.g., an edge gateway node). In some examples, the NIC 1020 may be embodied as part of a system-on-a-chip (SoC) that includes one or more processors or included on a multichip package that also contains one or more processors. In some examples, the NIC 1020 may include a local processor (not shown) and/or a local memory (not shown) that are both local to the NIC 1020. In such examples, the local processor of the NIC 1020 may be capable of performing one or more of the functions of the compute circuitry 1002 described herein. Additionally, or alternatively, in such examples, the local memory of the NIC 1020 may be integrated into one or more components of the client compute node at the board level, socket level, chip level, and/or other levels.

Additionally, in some examples, a respective compute node 1000 may include one or more peripheral devices 1014. Such peripheral devices 1014 may include any type of peripheral device found in a compute device or server such as audio input devices, a display, other input/output devices, interface devices, and/or other peripheral devices, depending on the particular type of the compute node 1000. In further examples, the compute node 1000 may be embodied by a respective edge compute node (whether a client, gateway, or aggregation node) in an edge computing system or like forms of appliances, computers, subsystems, circuitry, or other components.

Figure 10B:
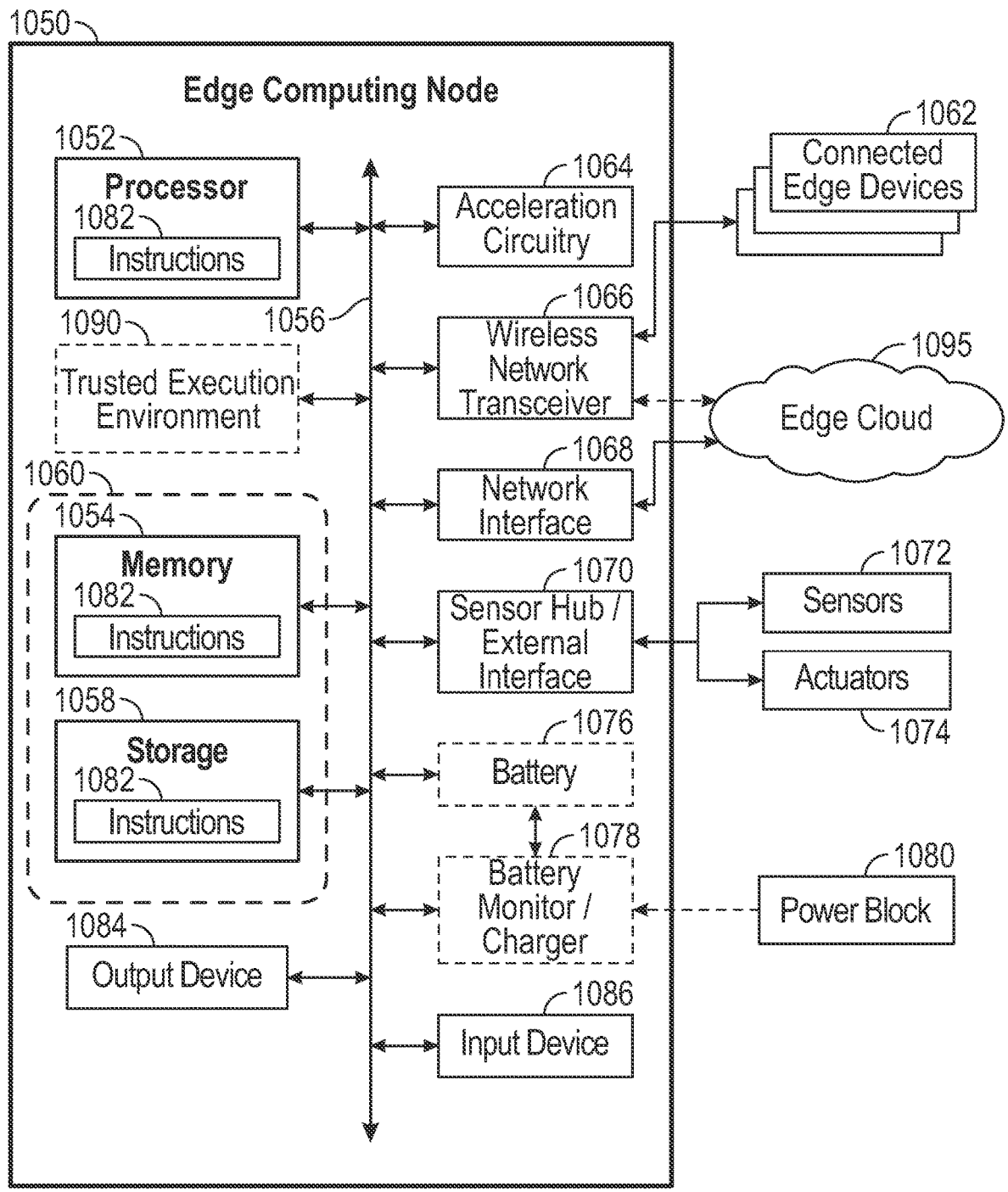
FIG. 10B provides a further overview of example components within a computing device in an edge computing system.

In a more detailed example, FIG. 10B illustrates a block diagram of an example of components that may be present in an edge computing node 1050 for implementing the techniques (e.g., operations, processes, methods, and methodologies) described herein. This edge computing node 1050 provides a closer view of the respective components of node 1000 when implemented as or as part of a computing device (e.g., as a mobile device, a base station, server, gateway, etc.). The edge computing node 1050 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 1050, or as components otherwise incorporated within a chassis of a larger system.

The edge computing node 1050 may include processing circuitry in the form of a processor 1052, which may be a microprocessor, a multi-core processor, a multithreaded processor, an ultra-low voltage processor, an embedded processor, or other known processing elements. The processor 1052 may be a part of a system on a chip (SoC) in which the processor 1052 and other components are formed into a single integrated circuit, or a single package, such as the Edison™ or Galileo™ SoC boards from Intel Corporation, Santa Clara, California. As an example, the processor 1052 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd., or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1052 and accompanying circuitry may be provided in a single socket form factor, multiple socket form factor, or a variety of other formats, including in limited hardware configurations or configurations that include fewer than all elements shown in FIG. 10B.

The processor 1052 may communicate with a system memory 1054 over an interconnect 1056 (e.g., a bus). Any number of memory devices may be used to provide for a given amount of system memory. As examples, the memory 1054 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example, the storage 1058 may be implemented via a solid-state disk drive (SSDD). Other devices that may be used for the storage 1058 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1056 may couple the processor 1052 to a transceiver 1066, for communications with the connected edge devices 1062. The transceiver 1066 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1062. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1066 (or multiple transceivers) may communicate using multiple standards or radios for communications at a different range. For example, the edge computing node 1050 may communicate with close devices, e.g., within about 10 meters, using a local transceiver based on Bluetooth Low Energy (BLE), or another low power radio, to save power. More distant connected edge devices 1062, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1066 (e.g., a radio transceiver) may be included to communicate with devices or services in the edge cloud 1095 via local or wide area network protocols. The wireless network transceiver 1066 may be a low-power wide-area (LPWA) transceiver that follows the IEEE 802.15.4, or IEEE 802.15.4g standards, among others. The edge computing node 1050 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1066, as described herein. For example, the transceiver 1066 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1066 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1068 may be included to provide a wired communication to nodes of the edge cloud 1095 or to other devices, such as the connected edge devices 1062 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to enable connecting to a second network, for example, a first NIC 1068 providing communications to the cloud over Ethernet, and a second NIC 1068 providing communications to other devices over another type of network.

Given the variety of types of applicable communications from the device to another component or network, applicable communications circuitry used by the device may include or be embodied by any one or more of components 1064, 1066, 1068, or 1070. Accordingly, in various examples, applicable means for communicating (e.g., receiving, transmitting, etc.) may be embodied by such communications circuitry.

The edge computing node 1050 may include or be coupled to acceleration circuitry 1064, which may be embodied by one or more artificial intelligence (AI) accelerators, a neural compute stick, neuromorphic hardware, an FPGA, an arrangement of GPUs, an arrangement of data processing units (DPUs) or Infrastructure Processing Units (IPUs), one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like.

The interconnect 1056 may couple the processor 1052 to a sensor hub or external interface 1070 that is used to connect additional devices or subsystems. The devices may include sensors 1072, such as accelerometers, level sensors, flow sensors, optical light sensors, camera sensors, temperature sensors, global navigation system (e.g., GPS) sensors, pressure sensors, barometric pressure sensors, and the like. The hub or interface 1070 further may be used to connect the edge computing node 1050 to actuators 1074, such as power switches, valve actuators, an audible sound generator, a visual warning device, and the like.

In some optional examples, various input/output (I/O) devices may be present within or connected to, the edge computing node 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 1050. A display or console hardware, in the context of the present system, may be used to provide output and receive input of an edge computing system; to manage components or services of an edge computing system; identify a state of an edge computing component or service, or to conduct any other number of management or administration functions or service use cases.

A battery 1076 may power the edge computing node 1050, although, in examples in which the edge computing node 1050 is mounted in a fixed location, it may have a power supply coupled to an electrical grid, or the battery may be used as a backup or for temporary capabilities. The battery 1076 may be a lithium ion battery, or a metal-air battery, such as a zinc-air battery, an aluminum-air battery, a lithium-air battery, and the like.

A battery monitor/charger 1078 may be included in the edge computing node 1050 to track the state of charge (SoCh) of the battery 1076, if included. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1078 may communicate the information on the battery 1076 to the processor 1052 over the interconnect 1056. The battery monitor/charger 1078 may also include an analog-to-digital (ADC) converter that enables the processor 1052 to directly monitor the voltage of the battery 1076 or the current flow from the battery 1076. The battery parameters may be used to determine actions that the edge computing node 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the edge computing node 1050. A wireless battery charging circuit, such as an LTC4020 chip from Linear Technologies of Milpitas, California, among others, may be included in the battery monitor/charger 1078. The specific charging circuits may be selected based on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine-readable medium 1060 including code to direct the processor 1052 to perform electronic operations in the edge computing node 1050. The processor 1052 may access the non-transitory, machine-readable medium 1060 over the interconnect 1056. For instance, the non-transitory, machine-readable medium 1060 may be embodied by devices described for the storage 1058 or may include specific storage units such as optical disks, flash drives, or any number of other hardware devices. The non-transitory, machine-readable medium 1060 may include instructions to direct the processor 1052 to perform a specific sequence or flow of actions, for example, as described with respect to the flowchart(s) and block diagram (s) of operations and functionality depicted above. As used herein, the terms "machine-readable medium" and "computer-readable medium" are interchangeable.

Also in a specific example, the instructions 1082 on the processor 1052 (separately, or in combination with the instructions 1082 of the machine readable medium 1060) may configure execution or operation of a trusted execution environment (TEE) 1090. In an example, the TEE 1090 operates as a protected area accessible to the processor 1052 for secure execution of instructions and secure access to data. Various implementations of the TEE 1090, and an accompanying secure area in the processor 1052 or the memory 1054 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1050 through the TEE 1090 and the processor 1052.

In further examples, a machine-readable medium also includes any tangible medium that is capable of storing, encoding, or carrying instructions for execution by a machine and that cause the machine to perform any one or more of the methodologies of the present disclosure or that is capable of storing, encoding, or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

ADDITIONAL NOTES & EXAMPLES

Example 1 is an apparatus comprising: an interface to receive smart sensor signals from at least one autonomous mobile entity (AME) in a physical workspace; and processing circuitry coupled to interface and configured to: detect a risk condition associated with the at least one AME, based on the smart sensor signals, relative to at least a first user device associated with a human present in the physical workspace; detect a direction of the risk condition relative to at least the first user device; and cause a notification to at least the first user device, the notification indicating the direction of the risk condition relative to at least the first user device.

In Example 2, the subject matter of Example 1 includes wherein the notification varies by at least one of a volume level and a frequency level of the notification depending on a level of severity of the risk condition.

In Example 3, the subject matter of Examples 1-2 includes wherein the processing circuitry is further configured to detect time until an encounter between the first user device and the risk condition, and wherein the level of severity of the risk condition is based on the time remaining to the encounter.

In Example 4, the subject matter of Examples 1-3 includes wherein the processing circuitry is further configured to predict locations of the AME based on a planned path of the AME.

In Example 5, the subject matter of Examples 1-4 includes wherein the notification varies by at least one of a noise level, a frequency level and a level of a tactile signal of the notification depending on a proximity of the risk condition to at least the first user device.

In Example 6, the subject matter of Examples 1-5 includes wherein the processing circuitry is further configured to detect a direction of the risk condition relative to at least a second user device, and wherein the direction of the risk condition relative to at least the second user device is different from the direction of the risk condition relative to at least the first user device.

In Example 7, the subject matter of Examples 1-6 includes wherein the processing circuitry is configured to provide, based on an estimated field of view of the first user device and location of the risk condition, a stereo effect to generate the notification as originating at the location of the risk condition when sensed by the user of the first user device.

In Example 8, the subject matter of Examples 1-7 includes wherein the notification includes a visual output indicating a direction of the risk condition relative to the apparatus.

In Example 9, the subject matter of Examples 1-8 includes wherein the interface comprises a Bluetooth interface.

In Example 10, the subject matter of Examples 1-9 includes circuitry to detect a physical location of the apparatus, and wherein the apparatus is configured to provide location information of the physical location over the interface.

In Example 11, the subject matter of Examples 1-10 includes generating a digital map of the physical workspace; and based on the digital map, the smart sensor signals, and at least the first user device, generate a risk profile map of the physical workspace.

In Example 12, the subject matter of Examples 1-11 includes wherein the processing circuitry is further configured to cause the notification to at least one of the AME and the first user device upon detecting a potential intersection of movement of the AME and the first user device.

Example 13 is a computer-readable medium including instructions that, when executed on a processor, cause the processor to perform operations including: receiving sensor signals from at least one autonomous mobile entity (AME) and at least one user device within a geographical location; based on a digital map of the geographical location, and based on the sensor signals received from the at least one AME and the at least one user device, generating a risk profile map of the geographical location; and causing a notification to be provided to the at least one user device upon detecting a potential intersection of movement of the at least one AME and the at least one user device.

In Example 14, the subject matter of Example 13 includes receiving input from at least one camera within the geographical location; and causing the notification to be transmitted upon detecting motion of the AME within a range of the at least one camera.

In Example 15, the subject matter of Examples 13-14 includes wherein the notification comprises a notification to adapt a path of the AME.

In Example 16, the subject matter of Examples 13-15 includes wherein the notification comprises a notification to adapt a speed of the AME.

In Example 17, the subject matter of Examples 13-16 includes wherein a speed of the AME is determined based on a reaction policy retrieved from a memory.

In Example 18, the subject matter of Examples 13-17 includes wherein the reaction policy includes at least two of speed thresholds, areas to avoid, and wait times based on traffic details within the geographical location.

In Example 19, the subject matter of Examples 13-18 includes wherein at least one of the sensor signals comprises a camera signal received from the at least one user device.

Example 20 is a system for notifying of risk in a physical workspace, the system comprising: means for receiving smart sensor signals from at least one autonomous mobile entity (AME) in the physical workspace; means for detecting a risk condition associated with the at least one AME, based on the smart sensor signals, relative to at least a first user device associated with a human present in the physical workspace; means for detecting a direction of the risk condition relative to at least the first user device; and means for causing a notification to be provided to at least the first user device, the notification indicating the direction of the risk condition relative to at least the first user device.

In Example 21, the subject matter of Example 20 includes means for providing the notification by varying at least one of a volume level and a frequency level of the notification depending on a level of severity of the risk condition.

In Example 22, the subject matter of Examples 20-21 includes means for detecting time until an encounter between the first user device and the risk condition, and wherein the level of severity of the risk condition depends on the time remaining to the encounter.

In Example 23, the subject matter of Examples 20-22 includes means for predicting locations of the AME based on a planned path of the AME.

In Example 24, the subject matter of Examples 20-23 includes means for providing the notification by varying at least one of a noise level, a frequency level and a level of a tactile signal of the notification depending on a proximity of the risk condition to at least the first user device.

In Example 25, the subject matter of Examples 20-24 includes means for generating a digital map of the physical workspace; based on the digital map, the smart sensor signals, and at least the first user device, means for generating a risk profile map of the physical workspace; and means for providing a notification to at least one of the AME and the first user device upon detecting a potential intersection of movement of the AME and the first user device.

Example 26 is a method for notifying of risk in a physical workspace, the method comprising receiving sensor signals from at least one autonomous mobile entity (AME) and at least one user device within a geographical location; based on a digital map of the geographical location, and based on the sensor signals received from the at least one AME and the at least one user device, generating a risk profile map of the geographical location; and causing a notification to be provided to the at least one user device upon detecting a potential intersection of movement of the at least one AME and the at least one user device.

In Example 27, the subject matter of Example 26 includes receiving input from at least one camera within the geographical location; and causing the notification to be transmitted upon detecting motion of the AME within a range of the at least one camera.

In Example 28, the subject matter of Examples 26-27 includes wherein the notification comprises a notification to adapt a path of the AME.

In Example 29, the subject matter of Examples 26-28 includes wherein the notification comprises a notification to adapt a speed of the AME.

In Example 30, the subject matter of Examples 26-29 includes wherein a speed of the AME is determined based on a reaction policy retrieved from a memory.

In Example 31, the subject matter of Examples 26-30 includes wherein the reaction policy includes at least two of speed thresholds, areas to avoid, and wait times based on traffic details within the geographical location.

In Example 32, the subject matter of Examples 26-31 includes wherein at least one of the sensor signals comprises a camera signal received from the at least one user device.

Example 33 is an apparatus comprising means to implement of any of Examples 1-32.

Example 34 is a system to implement of any of Examples 1-32.

Example 35 is a method to implement of any of Examples 1-32.

Example 36 is at least one machine-readable medium including instructions, which when executed by a machine, cause the machine to perform operations of any of the operations of Examples 1-32.

What is claimed is:

1. An apparatus comprising:
   an interface to receive smart sensor signals from at least one autonomous mobile entity (AME) in a physical workspace; and
   processing circuitry coupled to interface and configured to:
     detect a risk condition associated with the AME, based on the smart sensor signals, relative to at least a first user device associated with a human present in the physical workspace;
     detect a direction of the risk condition relative to a position of the first user device in the physical workspace and a direction of an estimated gaze of the human associated with the first user device, wherein the direction of the risk condition is associated with a first vector and the direction of the estimated gaze is associated with a second vector; and
     cause a notification to the first user device, the notification including information that indicates the direction of the risk condition relative to the position of the first user device and the direction of the estimated gaze of the human, wherein the notification is customized based on a distance to the risk condition and an angle between the first vector and the second vector.

2. The apparatus of claim 1, wherein the notification varies by at least one of a volume level and a frequency level of the notification depending on a level of severity of the risk condition.

3. The apparatus of claim 2, wherein the processing circuitry is further configured to detect time until an encounter between the first user device and the risk condition, and wherein the level of severity of the risk condition is based on the time remaining to the encounter.

4. The apparatus of claim 3, wherein the processing circuitry is further configured to predict locations of the AME based on a planned path of the AME.

5. The apparatus of claim 1, wherein the notification varies by at least one of a noise level, a frequency level and a level of a tactile signal of the notification depending on a proximity of the risk condition to the first user device.

6. The apparatus of claim 1, wherein the processing circuitry is further configured to detect a direction of the risk condition relative to a second user device associated with another human present in the physical workspace, and wherein the direction of the risk condition relative to the second user device is different from the direction of the risk condition relative to the first user device.

7. The apparatus of claim 1, wherein the processing circuitry is configured to provide, based on an estimated field of view of the first user device and location of the risk condition, a stereo effect to generate the notification as originating at the location of the risk condition when sensed by the human associated with the first user device.

8. The apparatus of claim 1, wherein the notification includes a visual output indicating a direction of the risk condition relative to the apparatus.

9. The apparatus of claim 1, wherein the interface comprises a Bluetooth interface.

10. The apparatus of claim 1, further comprising circuitry to detect a physical location of the apparatus, and wherein the apparatus is configured to provide location information of the physical location over the interface.

11. The apparatus of claim 1, wherein the processing circuitry is further configured to:
generate a digital map of the physical workspace; and
generate a risk profile map of the physical workspace based on the digital map, the smart sensor signals, and the position of the first user device.

12. The apparatus of claim 11, wherein the processing circuitry is further configured to cause the notification to at least one of the AME and the first user device upon detecting a potential intersection in the risk profile map of movement of the AME and the human associated with the first user device.

13. A non-transitory computer-readable medium including instructions that, when executed on a processor, cause the processor to perform operations including:
receiving sensor signals from at least one autonomous mobile entity (AME) and at least one user device within a geographical location, the at least one user device associated with a human present in the geographical location;
generating a risk profile map of the geographical location, based on a digital map of the geographical location, and based on the sensor signals received from the AME and the at least one user device;
detecting a risk condition associated with the AME relative to the at least one user device, based on the sensor signals;
detecting a direction of the risk condition relative to a position of the at least one user device in the geographical location and a direction of an estimated gaze of the human associated with the at least one user device, wherein the direction of the risk condition is associated with a first vector and the direction of the estimated gaze is associated with a second vector; and
causing a notification to be provided to the at least one user device upon detecting a potential intersection in the risk profile map of movement of the AME and the at least one user device, the notification including information that indicates the direction of the risk condition relative to at least the position of the at least one user device and the direction of the estimated gaze of the human, wherein the notification is customized based on a distance to the risk condition and an angle between the first vector and the second vector.

14. The non-transitory computer-readable medium of claim 13, wherein the operations further include:
receiving input from at least one camera within the geographical location; and
causing the notification to be transmitted upon detecting motion of the AME within a range of the at least one camera.

15. The non-transitory computer-readable medium of claim 13, wherein the notification comprises a notification to adapt a path of the AME.

16. The non-transitory computer-readable medium of claim 13, wherein the notification comprises a notification to adapt a speed of the AME.

17. The non-transitory computer-readable medium of claim 14, wherein a speed of the AME is determined based on a reaction policy retrieved from a memory.

18. The non-transitory computer-readable medium of claim 17, wherein the reaction policy includes at least two of speed thresholds, areas to avoid, and wait times based on traffic details within the geographical location.

19. The non-transitory computer-readable medium of claim 13, wherein at least one of the sensor signals comprises a camera signal received from the at least one user device.

20. A system for notifying of risk in a physical workspace, the system comprising:
means for receiving smart sensor signals from at least one autonomous mobile entity (AME) in the physical workspace;
means for detecting a risk condition associated with the AME, based on the smart sensor signals, relative to at least a first user device associated with a human present in the physical workspace;
means for detecting a direction of the risk condition relative to a position of the first user device in the physical workspace and a direction of an estimated gaze of the human associated with the first user device, wherein the direction of the risk condition is associated with a first vector and the direction of the estimated gaze is associated with a second vector; and
means for causing a notification to be provided to at least the first user device, the notification including information that indicates the direction of the risk condition relative to the position of the first user device and the direction of the estimated gaze of the human, wherein the notification is customized based on a distance to the risk condition and an angle between the first vector and the second vector.

21. The system of claim 20, further comprising means for providing the notification by varying at least one of a volume level and a frequency level of the notification depending on a level of severity of the risk condition.

22. The system of claim 21, further comprising means for detecting time until an encounter between the first user device and the risk condition, and wherein the level of severity of the risk condition depends on the time remaining to the encounter.

23. The system of claim 22, further comprising means for predicting locations of the AME based on a planned path of the AME.

24. The system of claim 20, further comprising means for providing the notification by varying at least one of a noise level, a frequency level and a level of a tactile signal of the notification depending on a proximity of the risk condition to the first user device.

25. The system of claim 20, further comprising:
means for generating a digital map of the physical workspace;
means for generating a risk profile map of the physical workspace based on the digital map, the smart sensor signals, and the first user device; and
means for providing a notification to at least one of the AME and the first user device upon detecting a potential intersection of movement of the AME and the first user device.

* * * * *